United States Patent
Khor et al.

(10) Patent No.: US 9,240,013 B2
(45) Date of Patent: *Jan. 19, 2016

(54) EVALUATION OF VOICE COMMUNICATIONS

(71) Applicant: III HOLDINGS 1, LLC, Wilmington, DE (US)

(72) Inventors: Chin H. Khor, Glendale, AZ (US); Marcel Leyva, Chandler, AZ (US); Vernon Marshall, Montclair, NJ (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,765

(22) Filed: Jun. 8, 2015

(65) Prior Publication Data

US 2015/0317641 A1    Nov. 5, 2015

Related U.S. Application Data

(63) Continuation of application No. 13/085,162, filed on Apr. 12, 2011, now Pat. No. 9,053,707, which is a continuation of application No. 11/160,476, filed on Jun. 24, 2005, now Pat. No. 7,940,897.

(51) Int. Cl.
*H04M 1/64* (2006.01)
*G06Q 30/00* (2012.01)
*G10L 25/48* (2013.01)

(52) U.S. Cl.
CPC .............. *G06Q 30/016* (2013.01); *G10L 25/48* (2013.01)

(58) Field of Classification Search
CPC ............................... G06Q 30/016; G10L 25/48
USPC .......... 379/88.01–88.04, 92.01, 93.18, 93.34, 379/406.03, 907; 704/220, 246, 254; 705/7.32, 10, 26
See application file for complete search history.

(56) References Cited

U.S. PATENT DOCUMENTS

| 4,712,243 A | 12/1987 | Ninomiya et al. |
| 4,961,229 A | 10/1990 | Takahashi |
| 5,027,407 A | 6/1991 | Tsunoda |

(Continued)

OTHER PUBLICATIONS

International Search Report and Written Opinion in Application No. PCT/US2005/040853 mailed Oct. 22, 2007, 9 pages.

(Continued)

*Primary Examiner* — Md S Elahee
(74) *Attorney, Agent, or Firm* — Meyertons, Hood, Kivlin, Kowert & Goetzel, P.C.

(57) ABSTRACT

One-to-many comparisons of callers' words and/or voice prints with known words and/or voice prints to identify any substantial matches between them. When a customer communicates with a particular entity, such as a customer service center, the system makes a recording of the real-time call including both the customer's and agent's voices. The system segments the recording to extract different words, such as words of anger. The system may also segment at least a portion of the customer's voice to create a tone profile, and it formats the segmented words and tone profiles for network transmission to a server. The server compares the customer's words and/or tone profiles with multiple known words and/or tone profiles stored on a database to determine any substantial matches. The identification of any matches may be used for a variety of purposes, such as providing representative feedback or customer follow-up.

20 Claims, 2 Drawing Sheets

(56) References Cited

U.S. PATENT DOCUMENTS

| | | |
|---|---|---|
| 5,054,083 A | 10/1991 | Naik et al. |
| 5,265,191 A | 11/1993 | McNair |
| 5,329,609 A | 7/1994 | Sanada et al. |
| 5,521,635 A | 5/1996 | Mitsuhashi et al. |
| 5,521,967 A | 5/1996 | Novas et al. |
| 5,579,046 A | 11/1996 | Mitsuhashi et al. |
| 5,608,784 A | 3/1997 | Miller |
| 5,623,539 A | 4/1997 | Bassenyemukasa et al. |
| 5,694,520 A | 12/1997 | Lyberg |
| 5,802,251 A | 9/1998 | Cohen et al. |
| 5,893,057 A | 4/1999 | Fujimoto et al. |
| 5,940,476 A | 8/1999 | Morganstein et al. |
| 6,161,090 A | 12/2000 | Kanevsky et al. |
| 6,205,204 B1 | 3/2001 | Morganstein et al. |
| 6,219,639 B1 | 4/2001 | Bakis et al. |
| 6,246,751 B1 | 6/2001 | Bergl et al. |
| 6,263,311 B1 | 7/2001 | Dildy |
| 6,266,640 B1 | 7/2001 | Fromm |
| 6,282,268 B1 | 8/2001 | Hughes et al. |
| 6,292,782 B1 | 9/2001 | Weideman |
| 6,349,288 B1 | 2/2002 | Barber |
| 6,356,868 B1 | 3/2002 | Yuschik et al. |
| 6,363,346 B1 | 3/2002 | Walters |
| 6,401,066 B1 | 6/2002 | McIntosh |
| 6,427,137 B2 | 7/2002 | Petrushin |
| 6,463,412 B1 | 10/2002 | Baumgartner et al. |
| 6,480,826 B2 | 11/2002 | Pertrushin |
| 6,510,415 B1 | 1/2003 | Talmor et al. |
| 6,519,565 B1 | 2/2003 | Clements et al. |
| 6,526,126 B1 | 2/2003 | Morganstein et al. |
| 6,529,871 B1 | 3/2003 | Kanevsky et al. |
| 6,529,881 B2 | 3/2003 | Morganstein et al. |
| 7,006,605 B1 | 2/2006 | Morganstein et al. |
| 8,540,514 B2 | 9/2013 | Gosling |
| 2002/0120519 A1 | 8/2002 | Martin et al. |
| 2002/0198806 A1 | 12/2002 | Blagg et al. |
| 2003/0023440 A1 | 1/2003 | Chu |
| 2003/0037004 A1 | 2/2003 | Buffum et al. |
| 2003/0046083 A1 | 3/2003 | Devinney et al. |
| 2003/0154072 A1 | 8/2003 | Young et al. |
| 2003/0221125 A1 | 11/2003 | Rolfe |
| 2004/0008828 A1 | 1/2004 | Coles et al. |
| 2004/0240631 A1 | 12/2004 | Broman et al. |
| 2006/0111959 A1 | 5/2006 | Tarr et al. |

OTHER PUBLICATIONS

Alvin F. Martin, et al., "Speaker Recognition in a Multi-Speaker Environment," Eurospeech, Sep. 2001, Aalborg, Denmark, 4 pages.

Aaron E. Rosenberg, et al., "Unsupervised Speaker Segmentation of Telephone Conversations," Voice Enabled Services Research Lab, AT&T Labs, pp. 565-568.

David Lau, "Speech Recognition: A rapid opportunity for wireless and Internet service providers," CTO Wirenix, Inc., www.wirenix.com/newsf0600-whitepaper.htm, 6 pages. [Retrieved Aug. 16, 2004].

Conversay, Speech Technology Solutions, An Introduction to Conversation Server Solutions, White Paper, printed Mar. 9, 2001, 11 pages.

Advisory Action in U.S. Appl. No. 11/160,476 mailed Jun. 30, 2008, 3 pages.

Advisory Action in U.S. Appl. No. 11/160,476 mailed Jun. 19, 2009, 3 pages.

Advisory Action in U.S. Appl. No. 11/160,476 mailed Apr. 27, 2010, 2 pages.

Office Action in U.S. Appl. No. 11/160,476 mailed Apr. 2, 2008, 21 pages.

Office Action in U.S. Appl. No. 11/160,476 mailed Apr. 27, 2009, 17 pages.

Office Action in U.S. Appl. No. 11/160,476 mailed Feb. 17, 2010, 16 pages.

Office Action in U.S. Appl. No. 11/160,476 mailed Oct. 19, 2007, 16 pages.

Office Action in U.S. Appl. No. 11/160,476 mailed Oct. 16, 2008, 19 pages.

Office Action in U.S. Appl. No. 11/160,476 mailed Sep. 16, 2009, 16 pages.

Office Action in U.S. Appl. No. 11/160,476 mailed Aug. 18, 2010, 15 pages.

Notice of Allowance in U.S. Appl. No. 11/160,476 mailed Jan. 18, 2011, 6 pages.

EVALUATION OF VOICE COMMUNICATIONS

CROSS REFERENCE TO RELATED APPLICATION

The present application is a continuation of U.S. application Ser. No. 13/085,162, filed Apr. 12, 2011 (now U.S. Pat. No. 9,053,707), which is a continuation of Ser. No. 11/160,476, filed Jun. 24, 2005 (now U.S. Pat. No. 7,940,897); the disclosures of each of the above-referenced applications are incorporated by reference herein in their entireties.

FIELD OF THE INVENTION

The present invention generally relates to a method for identifying the tone of a caller's voice in order to determine a change in attitude in an effort to improve the quality of customer service.

BACKGROUND OF THE INVENTION

With the influx of consumer call centers, many companies desire ways to gauge customer satisfaction with phone calls. Many call centers have some type of quality monitoring is in place which is used to ensure compliance adherence and to evaluate representative performance. However, limitations exist as a minimal number of customer calls are monitored, and the process is not used to gauge customer satisfaction/experience.

For example, conventional methods of call monitoring require manual listening/observing of the call to appropriate assess representative call handling as well as customer acceptance/dissatisfaction. Other call monitoring techniques focus primarily on tone profiles associated with a call and do not adequately assess the words or other call characteristics.

There is also a need for verification and evaluation of customer/satisfaction assessment systems. That is, there is a need to actively poll customers about their satisfaction with various phone calls, and there is a further need to use this poll information to better assess future customer calls.

SUMMARY OF THE INVENTION

A method and system for call monitoring to assess customer acceptance and dissatisfaction is provided. The invention facilitates extracting different customer and employee behaviors that correspond to the various words used during recorded customer servicing calls. The invention includes a system for recording, extracting, comparing and storing certain words and related behaviors. For example, in one embodiment, a word database is created based on known words that reveal a specific behavior. In another embodiment, a method for comparing words from recorded calls to the words stored in the database is provided. For example, in one embodiment, recordings are used to assess representative call handling, gauge customer satisfaction and experience for training purposes, along with facilitating employee feedback, training and development. The system and method may be configured to work in real-time, periodic intervals and/or at a delayed time.

BRIEF DESCRIPTION OF THE DRAWINGS

The accompanying drawings, wherein like reference numerals represent like elements, are incorporated in and constitute a part of this specification and, together with the description, explain the advantages and principles of the invention. In the drawings.

DETAILED DESCRIPTION

Figure 1:
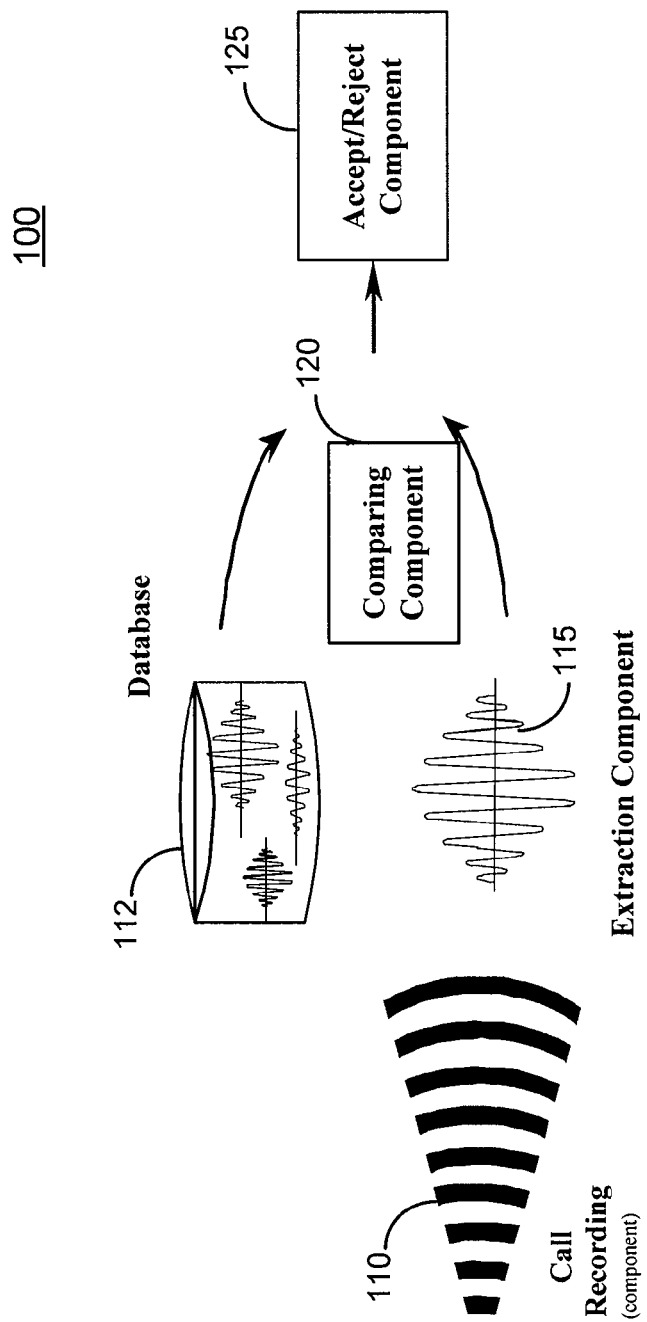
FIG. 1 is a block diagram of an exemplary word and tone recognition system in accordance with the present invention.

The detailed description of exemplary embodiments of the invention herein makes reference to the accompanying block diagrams and flowcharts, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the system may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention may be described herein in terms of block diagrams, screen shots and flowcharts, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), smart card technologies with the various algorithms being implemented with any combination of data structures, objects, processes, routines or other programming elements. Further, it should be noted that the present invention may employ any number of conventional techniques for data transmission, signaling, data processing, network control, and the like.

In addition, many applications of the present invention could be formulated. The exemplary network disclosed herein may include any system for accessing, storing, exchanging and/or otherwise manipulating user information, such as a distributed system, a thin cable network, an Ethernet, a token ring network, the Internet, an intranet, an extranet, wide area network (WAN), local area network (LAN), satellite communications, and/or the like. It is noted that the network may be implemented as other types of networks, such as an interactive television network (ITN).

The system user may interact with the system via any input device such as, a keypad, keyboard, mouse, kiosk, personal digital assistant, handheld computer (e.g., Palm Pilot®, Blueberry®), cellular telephone and/or the like. For example, any input device may also be a "pervasive computing device," such as a traditionally non-computerized device that is embedded with a computing unit, such as, for example, watches, Internet-enabled kitchen appliances, restaurant tables embedded with RF readers, wallets or purses with imbedded transponders, etc. Similarly, the invention could be used in conjunction with any type of personal computer, network computer, work station, minicomputer, mainframe, or the like running any operating system such as any version of Windows, Windows XP, Windows NT, Windows 2000, Windows 98, Windows 95, MacOS, OS/2, BeOS, Linux, UNIX, Solaris, MVS or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

FIG. 1 illustrates an exemplary block diagram of a tone/word recognition system 100 in accordance with the present invention. System 100 may include call recording component 110 configured with extraction component 115. System 100 may also include comparing component 120 configured for facilitating comparisons between extracted words and/or tones and words and/or tone profiles stored on database 112. System 100 may also comprise accept/reject component 125 configured for accepting, rejecting and/or analyzing matches between the extracted and saved words and/or tones. Although specific embodiments are discussed herein, one skilled in the art will appreciate that any of the components of the system may include only software, only hardware or a combination.

As used herein, the term "word" may refer to individual words, groups of words, phrases, sentences, tone, exclamations and/or other sounds or noises. A tone profile may refer to the sound profile that accompanies a given word. The tone profile may be stored as, for example, a number, a frequency-domain profile, a Gaussian distribution profile, a logarithmic distribution and/or any other way of quantifying and/or characterizing the tone accompanying a word.

While the system will be described herein with respect to telephone communications, one skilled in the art will appreciate that any communication device now known or hereinafter developed may also be used in the present invention. The system may include a host server or other computing systems including a processor for processing digital data (i.e., a digital signal processor), a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000/XP, Linux, Solaris, etc.) as well as various conventional support software and drivers typically associated with computers. Customer computer may be in a home or business environment with access to a network. In an exemplary embodiment, access is through the Internet through a commercially-available web-browser software package.

Communication between the parties to the transaction and the system of the present invention may be accomplished through any suitable communication means, such as, for example, a telephone network, intranet, Internet, point-of-interaction device (point-of-sale device, personal digital assistant, cellular telephone, kiosk, etc.), online communications, offline communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

Recording component 110 may comprise any recording hardware and/or software configured for recording a call, conversation, sound and/or other communication. Recording component 110 may be configured for use in conjunction with an agent telephone. Recording component 110 may be configured to record by any means known in the art, such as, for example, by digitizing the communication, analog means, tape recoding, storing in digital format, storing on a hard drive, disk, RAM, optical disk, and/or by any other recording method or system. For example, in one embodiment, recording component 110 is configured to record in a manner similar to that described in the method described in U.S. application Ser. No. 10/448,552 entitled "SPEAKER RECOGNITION IN A MULTI-SPEAKER ENVIRONMENT AND COMPARISON OF SEVERAL VOICE PRINTS TO MANY," filed on May 30, 2003, which is hereby incorporated by reference.

Extraction component 115 may comprise any software and/or hardware configured to extract various words and/or tones from a recorded conversation and store those words and/or tones in database 112. Extraction component 115 may be configured with one or more noise filters, time-domain signal processes, adaptive algorithms and/or other software to facilitate the parsing out of a voice signal from a mixture of sounds. For example, in one embodiment, extraction component 115 uses inter-microphone differential information and the statistical properties of independent signal sources to filter out the surrounding noise. In another embodiment, extraction component 115 employs one or more voice segmentation techniques similar to those disclosed in, for example, Aaron E. Rosenburg et al., *Unsupervised Speaker Segmentation of Telephone Conversations*, VOICE ENABLED SERVICES RESEARCH LAB (AT&T Labs, Florham Park, N.J.). Extraction component 115 may also be configured with recognition software to recognize and/or extract various words that are part of a communication and/or to extract the speaker's tone associated with that communication. Extraction component's 115 extractions of words and tones will be described in greater detail herein.

Comparing component 120 may be used to compare different communicated words to those stored in database 112. For example, comparing component 120 may be configured to determine whether a recorded word is the same as or similar to one that is stored on database 112. That is, comparing component 120 may search database 112 to determine whether the recorded word has been previously stored on the database. If the recorded word matches or sufficiently matches one of the stored words, comparing component 120 may send the recorded word to accept/reject component (accept/reject component) 125 as an "accept." If the recorded word does not sufficiently match one of the stored words, comparing component 120 may send the recorded word to accept/reject component 125 as a "reject."

In another embodiment, comparing component 120 is configured to quantify and/or qualify a recorded word based on one or more stored words and/or tone profiles. For example, comparing component 120 may initially quantify a recorded word based on one or more preset conditions and/or requirements. In one embodiment, any recorded word over 60 dB is quantified as a "high" tone profile word, while words between 40-59 dB may be quantified as "medium" tone profile words. In another embodiment, a Gaussian Mixture Model is associated with a word to facilitate comparisons by comparing component 120.

Comparing component 120 may be configured with one or more additional programs, processes and/or procedures to quantify and/or qualify a tone including, for example, voice recognition software, tone segmentation software, fundamental frequency information, vocal energy information, frequency spectral features, formants, linear predictive coding, neural networks, ensembles of classifiers, spectral analyzers, signal amplifiers and the like. Once the recorded word is sufficiently quantified, comparing component 120 may search database 112 to determine if there are any words with similar profiles stored on the database. If the recorded word and profile matches one of the stored words and its profile, comparing component 120 may send the recorded word to accept/reject component 125 as an "accept." If the recorded word and profile does not match one of the stored words and its profile, comparing component 120 may send the recorded word to accept/reject component 125 as a "reject."

Comparing component 120 may also use a server and/or any other computing system to compare the customer's voice print with multiple known voice prints to determine any substantial matches, meaning that the customer's voice print and one of the known voice prints are likely from the same person. The identification of any matches may be used for a variety of purposes, such as determining whether to authorize a transaction requested by the customer. For example, a cardholder may call a credit card institution to request replacement of a lost or stolen credit card. The credit card institution wants to ensure that the person calling is the true cardholder and not someone attempting to fraudulently obtain another person's credit card. By comparing the customer's voice print with the multiple known voice prints, associated with persons having attempted fraudulent transactions, the system may determine whether this customer is likely attempting to interact with another person's credit card account based upon any substantial matches with the known voice prints. For more information on speaker recognition, see the previously referenced U.S. application Ser. No. 10/448,552 entitled "SPEAKER RECOGNITION IN A MULTI-SPEAKER ENVIRONMENT AND COMPARISON OF SEVERAL VOICE PRINTS TO MANY."

Database 112 may be used to store various words and/or associated tone profiles. In one embodiment, database 112 is configured to store words associated with a negative customer response. For example, the words/phrases "no," "I'm sorry," "I can't," "I won't," "too bad," "forget it," "never mind," "whatever," "your problem," etc., may be stored in database 112. The tone profile associated with these words may also be stored and/or associated with the words. For example, if the tone accompanying the word "no," has a profile that is relatively high, the tone profile may be associated with the "no" to indicate that the "no" as one of disapproval and/or anger. However, if the tone accompanying a second "no" has a profile that is relatively low, the tone profile may be associated with the second "no" to indicate that the "no" is a responsive word.

Database 112 also stores information from consumer surveys. These consumer surveys contain information from customers regarding satisfaction, emotions, and/or other consumer feelings associated with previous calls. Comparing component 120 and/or any other software, hardware or component associated with system 100 uses information from these consumer surveys to determine whether the tone profiles and/or extracted words of the previous calls match the consumer survey responses from those calls.

Database 112 and any other database discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables may be preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, for example, storing individual files using an ISO/IEC 7816-4 file structure; implementing a domain whereby a dedicated file may be selected that exposes one or more elementary files containing one or more data sets; using data sets stored in individual files using a hierarchical filing system; data sets stored as records in a single file (for example, compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information may be stored in a storage space associated with a data set. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with a wide variety of system components by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuer. Each of these three exemplary data sets may contain different information that may be stored using different data storage formats and/or techniques. Further, each data set may contain subsets of data which also may be distinct from other subsets.

As stated above, in various embodiments of the present invention, the data may be stored without regard to a common format. However, in one exemplary embodiment of the present invention, the data set (e.g., BLOB) is annotated in a standard manner when provided for manipulating the data onto the network. The annotation may comprise a short header, trailer, or other appropriate indicator related to each data set that may be configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the user, user account identifier or the like. Each of these condition annotations are further discussed herein.

Embodiments consistent with the present invention may provide for one-to-few or one-to-many comparisons of callers' voice prints with known voice prints to identify any sufficient matches between them. For example, a caller's voice print may represent an electronic recording of a caller's voice, and the known voice prints represent electronic recordings of persons having a particular known characteristic. For example, the known voice prints may correspond with persons known to have engaged in attempted fraudulent transactions. Alternatively, the characteristic for the known voice prints may relate to other factors or criteria.

When a customer calls a particular entity, such as a customer service center, the system may make a recording of the real-time call including both the customer's and agent's voices. The system may segment the recording to extract at least a portion of the customer's voice to create a customer voice print, typically in digital form for computer processing. The system may also format the segmented customer voice print for network transmission to a server. Although the processing may occur locally, in some embodiments it may occur at a remote server, requiring network transmission of the customer's voice print. Also, the term customer is used for exemplary purposes and is intended to include any type of caller (e.g., merchant, travel agent, cardholder, agent of cardholder, processor, administrator, and/or the like) and any type of communication (e.g., human or electronic voice).

An account number, as used herein, may include any identifier for an account (e.g., insurance, credit, charge, debit, checking, savings, reward, loyalty, or the like), which may be maintained by a healthcare and/or transaction account provider (e.g., payment authorization center) and/or which may be used to complete a transaction. A typical account number (e.g., account data) may be correlated to an insurance account, a credit or debit account, loyalty account, or rewards account maintained and serviced by such entities as American Express®, Visa® and/or MasterCard® or the like. In addition, the account number (e.g., account data) may be associated with any device, code, or other identifier/indicia suitably configured to allow the user to interact or communicate with the system, such as, for example, authorization/access code, personal identification number (PIN), Internet code, digital certificate, biometric data, and/or other identification indicia. The account number may be optionally located on a medical insurance card, rewards card, charge card, credit card, debit card, prepaid card, telephone card, smart card, magnetic stripe card, bar code card, loyalty card and/or the like. The account number may be distributed and stored in any form of plastic, electronic, magnetic, audio device and/or optical device capable of transmitting or downloading data to a second device. A user account number may be, for example, a sixteen-digit credit card number, although each credit provider has its own numbering system, such as the fifteen-digit numbering system used by American Express®. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer.

In use, a customer calls a particular number which facilitates contacting an agent and/or customer representative. For example, the number could include a customer service help line for a particular entity or institution. The system may include multiple agent computers and telephones, such as in a call center, for receiving calls from customers, and a particular customer's call from a customer telephone may be routed to an available agent via a switching device such as a private branch exchange (PBX). Upon reaching an agent, the customer may be in communication with the agent via any wireline, optical or wireless network for data transmission such as, for example, a Transmission Control Protocol/Internet Protocol (TCP/IP) network.

As described herein, the computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the customer computer may employ a modem to occasionally connect to the Internet, whereas the bank computing center might maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors, (Sybex 1999); Deborah Ray and Eric Ray, "Mastering HTML 4.0" (1997); Loshin, "TCP/IP Clearly Explained" (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. In addition, an agent computer and/or agent telephone and host network may reside on a local area network which interfaces to a remote network for remote authorization of an intended transaction. Any computer and/or telephone used in the system may communicate with the remote network via a leased line, such as a T1, D3 line, or the like. Such communication methods are well known in the art, and are covered in a variety of standard texts. See, e.g., Gilbert Held, "Understanding Data Communications," (1996), hereby incorporated by reference.

The telephones discussed herein may include a conventional wireline telephone, a wireless or mobile telephone, a speaker phone, an Internet Protocol (IP) telephone, or a personal computer (PC) telephone. For example, in one embodiment, each telephone in the system is implemented with the same or different physical devices. In one embodiment, an agent telephone is implemented with a PC telephone. In another embodiment, a computer may also be configured represent a switch to route calls to a PC telephone.

The computers discussed herein may provide a suitable website, webpage or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, InterBase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a browser which includes a URL (http://yahoo.com/stockquotes/ge) and an IP address (123.56.789). The web service retrieves the appropriate WebPages and sends the WebPages to the IP address.

Figure 2:
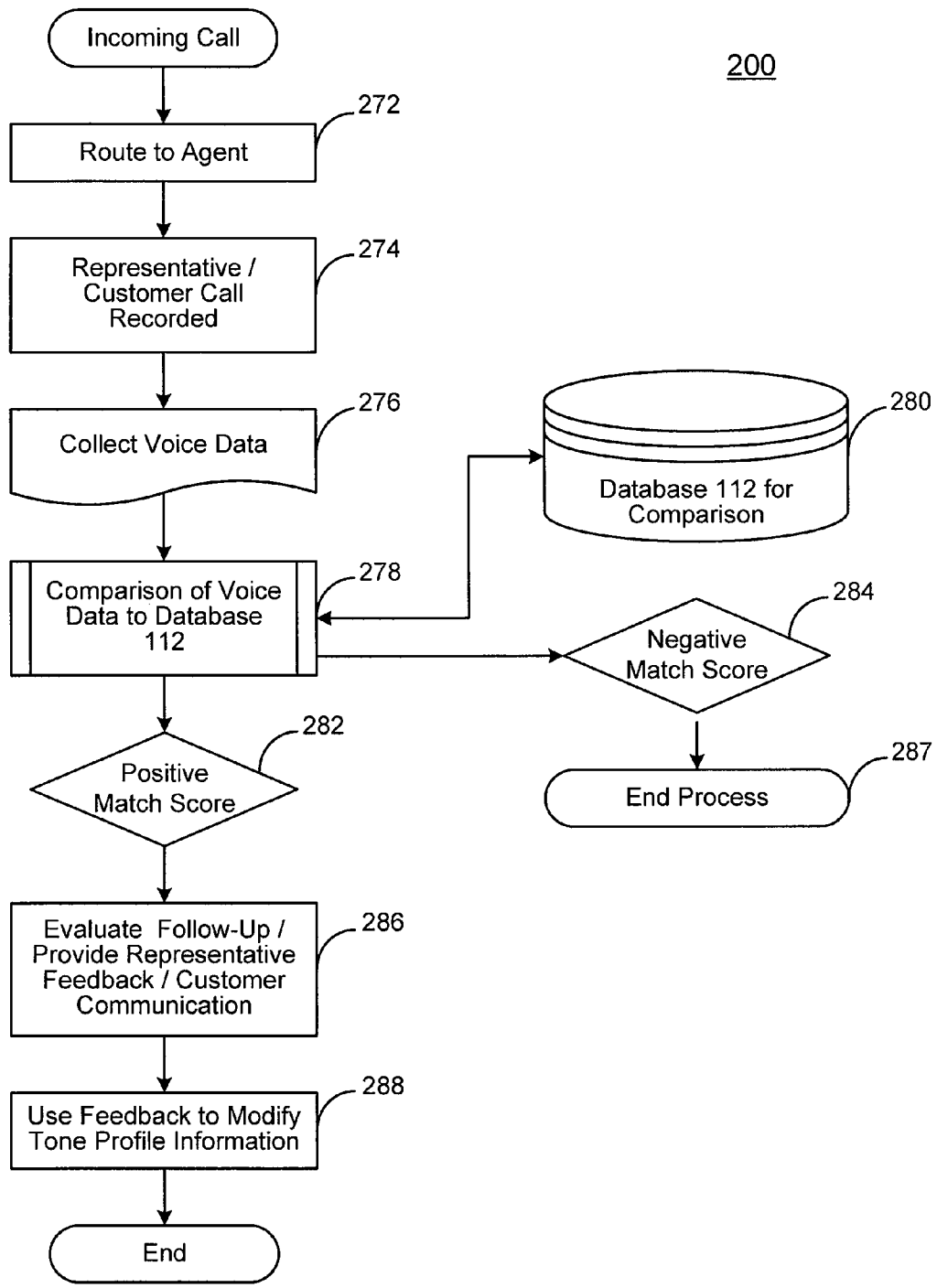
FIG. 2 is a flow chart of an exemplary method for word recognition in accordance with the present invention.

FIG. 2 illustrates a flow chart of an exemplary tone/word recognition method 200 for sufficiently recognizing tones and/or words for processing. Method 200 may be implemented in, for example, hardware and/or software modules for execution by an agent computer. The various steps of method 200, and other described methods, are shown in a particular order for illustrative purposes. The steps may occur in a different order and steps may be added or eliminated from the methods, depending upon a particular implementation, for example.

In an exemplary embodiment, an agent may receive a customer call from a customer telephone via routing through a communications network (step 272). As indicated above, this call may be received from a variety of types of telephones or other communications devices via any communications network. The customer call may be routed to an agent telephone via a PBX or other switching device described herein. During the telephone call, an agent computer may record at least a portion of the call using recording component 110, including both the agent's and caller's (customer's) voice (step 274). An agent computer may be also be configured to facilitate segmentation, noise reduction/filtering and/or other similar manipulations of at least a portion of the different parts of the call (i.e., segmenting the caller's voice from the agent's voice). Extraction component 115 may also be used to eliminate background noise, further differentiate the customer's and/or agent's voice and/or further facilitate differentiation of words and/or voices. Extraction component 115 may employ one or more algorithms known in the art for performing this type of segmentation. Extraction component 115 may also extract different voices based on biometric voice prints. For example, each person's voice has a unique voice print, due to for example the various combinations of frequencies within each person's voice, and thus one person's voice may be extracted from a recording containing multiple voice recordings. Voice recognition biometrics may include recognition of voice and/or speaker features such as, phonated excitation, whispered excitation, frication excitation, compression, vibration, parametric waveforms, tone, pitch, dialect, annunciation, and/or any portion thereof. These voice recognition features may be collectively referred to as a "voice print." System 100 may be used in conjunction with method 200, and it may be configured with an audio capture device such as a microphone, telephone, cellular telephone, speaker and/or other hardware and/or software for acquiring voice print data.

The recording of the segmented caller's voice may be formatted by recording component 110 and/or extraction component 115 for collection (step 276). For example, it may be formatted into a way file, known in the art and identified by a .wav extension. The use of a way file, for example, provides for a standard format for network transmission to a server computer. Alternatively, the recording may be formatted into any type of file that may be transmitted via a TCP/IP or other network. Recording component 110 and/or extraction component 115 may be configured to digitize the recorded words, voice prints, and/or tone profiles and compare it against digitized words, voice prints, and/or tone profiles stored in database 112 (step 278). The words, voice prints, and/or tone profiles may additionally be compared with similar information stored on one or more third-party databases communicating system 100 through any communication software and/or hardware.

One or more comparison techniques and/or technologies may be used for comparisons. For example, comparing component 120 may utilize an existing database to compare the words, voice prints, and/or tone profiles by comparing words, voice prints, and/or tone profile waveforms in the time domain, by comparing energy content in the words, voice prints, and/or tone profiles across the frequency domain, by the use of stochastic models and/or template models, and/or by any other voice recognition or comparing method known in the art. Based on methods such as these, the user may assess the false reject/accept errors to identify an appropriate threshold for rejection or acceptance. Different accents may be addressed by modifying this threshold. For example, the detection system is represented with a curve, which represents the system performance for each threshold value. This curve is called Receiver Operating Characteristics (ROC) or Detection Error Trade-off (DET). This ROC curve may be modified depending on various input parameters such as, for example, accent information, speech pathology information, and the like. Transfer of information may include use of encryption, decryption, security keys, digital certificates and/or other security devices to confirm the security of the sample. One or more third-party devices such as voice recognition software and/or hardware systems to facilitate word, voice and tone profile comparisons may additionally be used, such as, for example, those developed by SAFLINK and Voice Security Systems.

Comparison of words, voice prints, and/or tone profiles may be completed in real time, batch time, periodic intervals, online and/or offline. During these comparisons, comparing component 120 may be configured to search database 112 (step 280) for one or more word, voice print, and/or tone profile sufficiently matches. If comparing component 120 determines that the recorded information sufficiently matches the information on database 112, comparing database may send a positive match score (i.e., an "accept message") to accept/reject component 125 (step 282). Accept/reject component 125 may then be used to evaluate the telephone call, follow-up on the telephone call, provide statistical and/or other feedback to representatives and/or customers on the call and/or to facilitate further customer communication, such as, for example, conducting consumer surveys to assess customer satisfaction with various calls. (step 286).

In one embodiment, providing feedback, accept/reject component 125 may analyze the call to determine the number of negative and/or positive words and/or tone profiles uttered by the caller and/or representative. Accept/reject component 125 may use this information to characterize and/or categorize the call as a positive and/or negative call. For example, system 100 may be used to track how many positive and/or negative calls a certain representative handles in order to track and/or grade the representative's handling of the different calls. That is, system 100 may be used to track the number of positive and/or negative words used by the customer representative and/or the caller throughout one or more calls to facilitate a determination of whether the representative is providing helpful assistance to the caller and/or whether the representative is acting professionally. If an accept/reject component 125 analysis shows a growing trend during a call in the number of negative words and/or tone profiles, accept/reject component 125 may be configured to flag the call, flag a file corresponding to the representative, send a signal, and/or provide any other type of feedback and/or warning. A representative with a flagged file may then be required to attend training, etc.

In another embodiment, comparing component 120 and/or any other component, or system, such as accept/reject component 125, analyzes information from a consumer survey associated with the call and compares that survey information to the words and/or associated tone profiles and/or other characteristics of the call to assess the accuracy of comparing component 120 and/or accept/reject component 125 (step 288). For example, words and/or associated tone profiles and/or other call characteristic may indicate that the consumer was not highly satisfied during the call. Comparing component 120 and/or any other software, hardware or component associated with system 100 can compare the results of a consumer survey associated with the call to verify whether the words and/or associated tone profiles and/or other characteristics correctly matched the reported consumer satisfaction with the call. If the consumer survey indicates higher customer satisfaction than what is indicated by the words and/or associated tone profiles and/or other characteristics, comparing component 120, accept/reject component 125 and/or any other component or software associated with system 100 uses the survey information is used to modify the customer response level associated with the call's words and/or associated tone profiles. This active interaction and incorporation of customer survey responses with the words and/or associated tone profiles, creates a more accurate and ever-evolving customer assessment system.

If comparing component 120 determines that the recorded information does not match the information on database 112, comparing database may send a negative match score (i.e., a "reject message") to accept/reject component 125 (step 284). A negative match score may then terminate the process as accept/reject component 125 may be unable to provide feedback and/or follow-up (step 287).

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:

1. A method, comprising:
   receiving, by a computing system, data indicative of a user response to a question;
   extracting, by the computing system, at least one word from an electronic representation of a voice communication of the user; and
   adjusting, by the computing system, content of the data indicative of the user response, based on a determination that the extracted word is inconsistent with the user response to the question.

2. The method of claim 1, wherein the voice communication of the user includes the user response to the question.

3. The method of claim 1, wherein the voice communication of the user does not include the user response to the question.

4. The method of claim 1, further comprising:
   evaluating a customer representative's interaction with the user based on the determination.

5. The method of claim 1, further including:
   performing extracting for a plurality of calls to produce a plurality of extracted words; and
   determining user responses to the question for users corresponding to the plurality of calls; and
   updating information indicating whether the extracted word is consistent with a particular response to the question.

6. The method of claim 1, further including:
   generating a caller voice print from the at least a portion of an electronic representation; and
   comparing the caller voice print to a known voice print.

7. The method of claim 1, wherein the extracting includes a segmenting step.

8. The method of claim 7, wherein the segmenting step includes detecting a caller voice print within the electronic representation, distinct from a voice of a customer representative, and removing one or more portions of the caller voice print in the electronic representation to produce the extracted word.

9. The method of claim 1, further comprising determining a probability, greater than a particular threshold, that the extracted word and a known word are the same.

10. The method of claim 9, wherein the determining the probability includes using at least one of:
a Gaussian Mixture Model, voice recognition, tone segmentation, fundamental frequency information, vocal energy information, frequency spectral features, formants, linear predictive coding, neural networks, ensembles of classifiers, spectral analyzers, or signal amplifiers.

11. The method of claim 1, further comprising tracking, by the computing system, a number of negative words spoken by the user over at least a portion of the voice communication.

12. A non-transitory computer-readable medium having instructions stored thereon that are executable by a computing device to perform operations comprising:
receiving data indicative of a user response to a question;
performing speech recognition on an electronic representation of a voice communication of the user, to determine at least one word spoken by the user in the voice communication; and
adjusting content of the data indicative of the user response, based on a determination that the word is inconsistent with the user response.

13. The non-transitory computer-readable medium of claim 12, wherein the operations further comprise:
storing a plurality of known words; and
comparing the word to the plurality of known words and determining a match to one of the known words.

14. The non-transitory computer-readable medium of claim 12, wherein the operations further comprise:
classifying the user response as positive or negative; and
classifying the word as positive or negative.

15. The non-transitory computer-readable medium of claim 12, wherein the operations further comprise:
scheduling a follow-up action based on the determination.

16. The non-transitory computer-readable medium of claim 12, wherein the operations further comprise:
determining a probability, greater than a particular threshold, that the word and a known word are the same.

17. A system, comprising:
one or more processors; and
one or more memories having program instructions stored thereon that are executable by the one or more processing to cause the system to perform operations comprising:
receiving data indicative of a user response to a question;
extracting at least one word from an electronic representation of a voice communication of the user; and
adjusting content of the data indicative of the user response, based on a determination that the extracted word is inconsistent with the user response to the question.

18. The system of claim 17, wherein the adjusting is further based on a number of negative words extracted from the voice communication.

19. The system of claim 17, wherein the operations further comprise:
storing a plurality of known words; and
comparing the extracted word to the plurality of known words and determining a match to one of the known words.

20. The system of claim 17, evaluating a customer representative's interaction with the user based on the determination.

\* \* \* \* \*